UNITED STATES PATENT OFFICE.

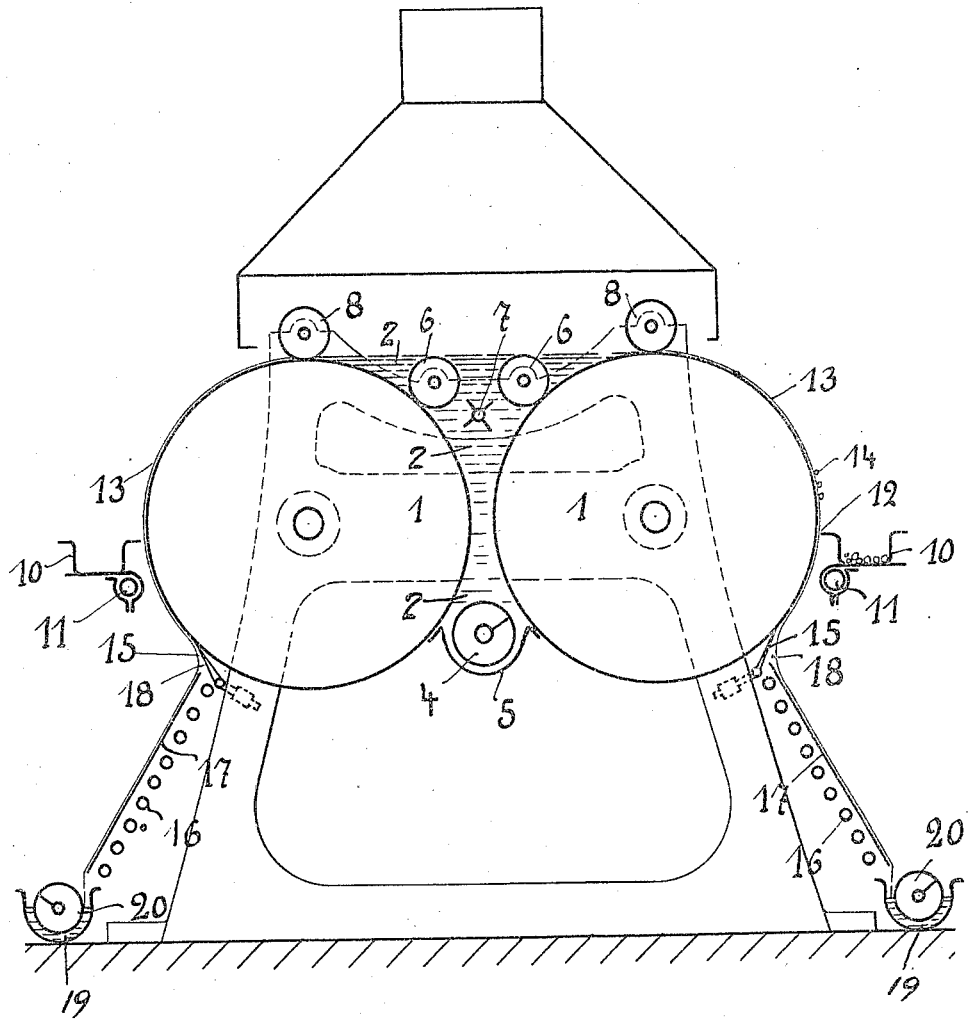

THEODOR DRZYMALLA, OF MAGDEBURG, GERMANY.

TWO-ROLL DRYING APPARATUS FOR PULP-LIKE PASTE.

1,014,956.        Specification of Letters Patent.      Patented Jan. 16, 1912.

Application filed March 29, 1911. Serial No. 617,697.

*To all whom it may concern:*

Be it known that I, THEODOR DRZYMALLA, a subject of the German Emperor, and resident of 4 Lübeckerstrasse, Magdeburg, Germany, engineer, have invented certain new and useful Improvements in Two-Roll Drying Apparatus for Pulp-Like Paste, of which the following is a specification.

The present invention relates to driers and is especially adapted to dry, roll or spread to a film or veil and to break into flocks potatoes. It is constructed on the well known drum or roll drier principle and has for its objects to peel the potatoes and prevents the peels from passing into the potato film or mash as it finally emerges from the machine, to produce a better article and also to prevent a coating from forming on the rollers, all of which objects, among others, are accomplished by the construction and combination of parts hereinafter more specifically set forth and claimed.

The accompanying drawing illustrates a vertical cross-sectional view of a machine embodying my invention, omitting the gearing.

The drier rolls or drums 1 are mounted in the frame of the machine, as illustrated, and adapted to turn in opposite directions away from each other. Each drum or roll 1 is of course heated as usual, in any desired manner. These drums 1 are arranged so that their nearest points are only a few millimeters apart so that they will partially mash the potatoes passing upward between them, forming a pasty mass. Each end of the space between the drums 1 is covered and the bottom is closed by a trough 5, thus forming the wedge shaped boiler 2, which is fed with potatoes at the bottom by means of the screw conveyer 4 located in the trough 5. Above each drum 1 are arranged a roller 6, near the inner edge of each drum and a roller 8 a little higher than roller 6 and in the same vertical plane as the axis of its corresponding drum 1, said rollers 6 and 8 being journaled in the frame above mentioned and each being arranged with a very slight space between them and the corresponding drum 1, the roller 8 in each instance being cold, its office being to smooth the film of potato mash and to remove all peels and smooth out any bubbles. An agitator or masher 7 is journaled in said frame and runs from side to side thereof, extending through the boiler space 2 between the drums 1 and a little below the rollers 6.

The feeding screw-conveyer 4 feeds the potatoes into the boiler 2 at its lower part between the lower parts of drums 1, which press them upward and mash them, in turn feeding them in the form of a lumpy paste into the upper part of boiler 2, which part of the boiler may be designated as the cooking space. In this space they come to rest as a mass and a strong evaporation takes place, this evaporation being aided by the forward squeezing and feeding action of the drums 1 above described. While in this space the mass is agitated by the stirrer 7 and this, with the action of the rising steam, thoroughly loosens and separates the peels from the potatoes. The mass from this space now passes in the form of a thin veil or film between each roller 6 and the drum 1. After it has passed the roller 6 it is found to still contain bubbles and peels to some extent so it is found necessary to pass it between the drum 1 and the cold roller 8. This roller being cold the peelings by reason of their starchy nature will stick to them at the same time it mashes out all bubbles, hence it removes both the peels and the bubbles and the layer, veil or film as it finally emerges from under roller 8 is found to be white and free from bubbles and peels. These peels and damp lumps, &c., may be scraped off or otherwise removed from the rollers 8. Sometimes, however, the peels and wet lumps of mashed potato that would deteriorate the finished product if allowed to remain thereon, drop from the cold rollers 8 onto the thin veil, layer or film of potato after it has passed under said rollers 8, as illustrated by the lumps and peels marked 14 in the drawing. To meet this contingency a scraper and trough 10 is arranged close to each drum 1 so that the layer or film of potato may pass between said drum and said scraper, but so that any peels or lumps adhering to said layer or veil would be scraped off by said scraper and fall into the trough provided therefor as illustrated by the drawings, see numeral 10. Said scraper and trough 10 may be secured in such position in any convenient manner on rod 11. At a convenient point near the lower part of each of said drums 1 and on the outside of the machine is mounted a scraper knife 15 which engages the drums 1 and separates the veils, films or layers of potato from the said drums. Below each of said knives 15 and at an angle thereto is arranged a conveyer plate 17 on which the film of potato passes from each of the drums 1. Between said knife and said plate and the film, veil or layer of potato where it is separated from its drum is formed an air space 18 which may be filled with heated air to aid in drying the film, veil or layer of potato. Each conveyer plate 17 is similarly heated by means of the heater 16 and for the same purpose. From each plate 17 the film passes into troughs 19 where it is broken into flocks by the screw-conveyer 20 and conveyed to the desired point.

All of the rollers, drums, screw-conveyers and the agitator are geared up together and driven from one source of power, the gearing and source of power not being shown, however, in the drawing.

Having thus described my invention, what I claim as new and desire to secure by Letters Patent is:

1. A potato drier consisting of a frame, two large heated drying and mashing drums mounted in said frame and turning in opposite directions away from each other, a wedge shaped boiler formed between said drums, a screw feeder located in the bottom of said boiler and an agitator located in the upper part of said boiler, in combination with a spreading roller for each drum, a cold smoothing and peel removing roller for each drum, a scraper for each drum, a plate conveyer for each drum receiving the potato film or layer from each drum respectively, said knife and plate forming a hot air space, means for heating said conveyer plates to facilitate the drying action, a trough receiving the potato film or layer from each of the conveyer plates, a screw-conveyer located in each last mentioned trough and means for actuating the device, said rollers, drums, screw conveyers and agitator being geared up together.

2. A potato masher and drier comprising a frame, two large heated drums mounted in said frame and turning in opposite directions away from each other, a boiler formed between said drums, means for feeding the potatoes to the bottom of said boiler and an agitator in the upper part of said boiler, in combination with a spreading roller for each drum, a cold smoothing and peel removing roller for each drum, means of separating the film of potato from the drum, a plate receiving the film from the drum, means for heating said plate, a trough for each plate receiving the film therefrom and means for conveying the film from each of said troughs, all as, and for the purpose, set forth.

3. A potato masher and drier comprising a frame, a plurality of large heated drums mounted in said frame and turning in opposite directions, a boiler formed between them, means for feeding the potatoes from below to said boiler and an agitator in said boiler, in combination with a cold smoothing roller for each drum, means of separating the film from each drum, a plate receiving the film from each drum, means of heating each of said plates, a trough for each plate receiving the film from its respective plate and a screw conveyer located in said trough.

4. A potato masher and drier comprising a frame, a heated drum mounted and turning in said frame, said drum forming one side of a boiling or cooking space, means of feeding potatoes from below into this space, and an agitator located in said space, in combination with a spreading roller for spreading the potato in a film on said drum, a cold smoothing and peel removing roller removing all peels and bubbles and smoothing said film, means for separating the film from the drum, a plate receiving the film from the drum, means for heating said plate, a receptacle receiving the film from said plate and means for conveying the film from said receptacle to the desired point.

5. A pair of heated drums having a boiler space between them, in combination with a fixed part at the bottom of said space to form said boiler and two pairs of rollers in contact with said drums to act on the films of mashed material adhering thereto as these films are lifted from said boiler, the second pair of rollers being cold to more effectually complete the smoothing of these films, substantially as set forth.

6. A pair of drums turning in proximity to each other and having a boiler space between them, at least one of said drums being heated, in combination with a peel separating roller which receives the film of mashed material between it and said heated drum as the said film rises with said drum from the boiler, a cold roller which completes the smoothing of said film by pressing the latter against said drum as it comes from the first named roller and means for scraping the film from said drum and delivering it beyond the same.

In testimony, that I claim the foregoing as my invention, I have signed my name in presence of two subscribing witnesses.

THEODOR DRZYMALLA.

Witnesses:
 HANS EYELER,
 FRIEDA LADEBECK.